United States Patent
Chu et al.

(10) Patent No.: US 11,181,787 B2
(45) Date of Patent: Nov. 23, 2021

(54) TOUCH APPARATUS

(71) Applicant: Au Optronics Corporation, Hsinchu (TW)

(72) Inventors: Hsun-Chen Chu, Hsinchu (TW); Pei-Ming Chen, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 164 days.

(21) Appl. No.: 16/572,613

(22) Filed: Sep. 17, 2019

(65) Prior Publication Data
US 2020/0393711 A1    Dec. 17, 2020

(30) Foreign Application Priority Data
Jun. 14, 2019    (TW) ................ 108120651

(51) Int. Cl.
*G02F 1/1343* (2006.01)
*G02F 1/1368* (2006.01)
*G06F 3/041* (2006.01)

(52) U.S. Cl.
CPC .......... *G02F 1/1343* (2013.01); *G02F 1/1368* (2013.01); *G06F 3/0412* (2013.01)

(58) Field of Classification Search
CPC ..... G02F 1/1343; G02F 1/1368; G06F 3/0412
See application file for complete search history.

(56) References Cited

U.S. PATENT DOCUMENTS

| | | | | |
|---|---|---|---|---|
| 9,939,972 | B2* | 4/2018 | Shepelev | G06F 3/0443 |
| 2012/0298405 | A1* | 11/2012 | Yu | G06F 3/0445 |
| | | | | 174/250 |
| 2014/0197428 | A1* | 7/2014 | Wang | G07F 17/32 |
| | | | | 257/88 |
| 2016/0062164 | A1* | 3/2016 | Chae | G06F 3/04164 |
| | | | | 349/12 |
| 2018/0157362 | A1* | 6/2018 | Kim | G02F 1/133528 |
| 2018/0307076 | A1* | 10/2018 | Chen | G02F 1/133345 |
| 2019/0235668 | A1* | 8/2019 | Ye | G06F 3/04164 |
| 2019/0369787 | A1* | 12/2019 | Park | G06F 3/044 |
| 2020/0110495 | A1* | 4/2020 | Han | H01L 27/3276 |
| 2020/0133415 | A1* | 4/2020 | Choi | G06F 3/0446 |
| 2020/0159369 | A1* | 5/2020 | Seo | H01L 27/3276 |
| 2020/0167041 | A1* | 5/2020 | Jeong | G06F 1/1684 |
| 2020/0168671 | A1* | 5/2020 | Jang | H01L 51/5253 |

(Continued)

Primary Examiner — Carolyn R Edwards
Assistant Examiner — Eboni N Giles
(74) Attorney, Agent, or Firm — JCIPRNET

(57) ABSTRACT

A touch apparatus includes a substrate, a plurality of pixel structures, a first touch electrode, a second touch electrode, a third touch electrode and a first conductive pattern. The first touch electrode and the second touch electrode are located at a first side of a transparent window. The third touch electrode is located at a second side of the transparent window. The first touch electrode, the second touch electrode and the third touch electrode are sequentially arranged in a first direction. A main portion of the first conductive pattern is electrically connected to the first touch electrode. The main portion of the first conductive pattern overlaps with the second touch electrode and is electrically isolated from the second touch electrode. A dummy portion of the first conductive pattern is electrically connected to the third touch electrode and structurally separated from the main portion of the first conductive pattern.

13 Claims, 12 Drawing Sheets

(56) References Cited

U.S. PATENT DOCUMENTS

| | | | |
|---|---|---|---|
| 2020/0173949 A1* | 6/2020 | Lee | G06F 3/04164 |
| 2020/0328257 A1* | 10/2020 | Kim | H01L 51/5056 |
| 2020/0348783 A1* | 11/2020 | Wang | G06F 3/0443 |
| 2020/0381486 A1* | 12/2020 | Jeong | G06F 3/0446 |

* cited by examiner

TOUCH APPARATUS

CROSS-REFERENCE TO RELATED APPLICATION

This application claims the priority benefit of Taiwan application serial no. 108120651, filed on Jun. 14, 2019. The entirety of the above-mentioned patent application is hereby incorporated by reference herein and made a part of this specification.

BACKGROUND

Technical Field

The present invention relates to an electronic device, and more particularly, to a touch apparatus.

Description of Related Art

Display panels are used increasingly, such as home audio-video entertainment equipment, information display billboards in public places, displays for electronic gaming, and portable electronic products. A portable electronic product (for example, a smart phone) is taken as an example. In recent years, in order to make the display panel have a high screen-to-body ratio, a manufacturer sets an electronic element (for example, a camera) in an active region of the display panel, so that at least one side of the display panel does not need to be provided with a border.

From the view of a user, the electronic element (for example, the camera) is surrounded by a plurality of pixel structures for displaying. In order to enable the plurality of pixel structures on two opposite sides of the electronic element to be electrically connected to each other, a plurality of connection lines need to be arranged around a transparent window corresponding to the electronic element. However, when the resolution of the display panel is increased, the number of the plurality of connection lines is also inevitably increased, causing a large width of a line region for setting the connection lines, which affects the visual effect of the display panel.

In addition, when a touch electrode is disposed in the display panel, a conductive pattern configured to electrically connect the touch electrode with a driving circuit needs to bypass the transparent window in order to enable the touch electrode and the driving circuit which are respectively located at two opposite sides of the transparent window to be electrically connected with each other, so that it is more difficult to reduce the width of the line region.

SUMMARY

The present invention is directed to a touch apparatus with a good visual effect.

The touch apparatus of the present invention includes a substrate, a plurality of pixel structures, a first touch electrode, a second touch electrode, a third touch electrode and a first conductive pattern. The substrate has a transparent window, a line region and an active region. The line region is located around the transparent window, and the line region is located between the active region and the transparent window. The plurality of pixel structures are disposed on the active region of the substrate. The first touch electrode, the second touch electrode and the third touch electrode are disposed on the active region of the substrate, and overlap with the plurality of pixel structures. The transparent window has a first side and a second side which are opposite. The first touch electrode and the second touch electrode are located at the first side of the transparent window. The third touch electrode is located at the second side of the transparent window. The first touch electrode, the second touch electrode and the third touch electrode are sequentially arranged in a first direction. The first conductive pattern has a main portion and a dummy portion. The main portion of the first conductive pattern is electrically connected to the first touch electrode, and the main portion of the first conductive pattern overlaps with the second touch electrode and is electrically isolated from the second touch electrode. The dummy portion of the first conductive pattern is electrically connected to the third touch electrode and structurally separated from the main portion of the first conductive pattern.

In one embodiment of the present invention, the touch apparatus further includes an insulating layer, disposed between the first conductive pattern and the first touch electrode and between the first conductive pattern and the third touch electrode. The insulating layer has a first contact window and a second contact window. The third touch electrode is electrically connected to the dummy portion of the first conductive pattern through the first contact window of the insulating layer. The first touch electrode is electrically connected to the main portion of the first conductive pattern through the second contact window of the insulating layer. The main portion of the first conductive pattern includes a continuous line segment, and a vertical projection of the continuous line segment on the substrate is located between a vertical projection of the first contact window and a vertical projection of the second contact window, and the continuous line segment overlaps with the second touch electrode.

In one embodiment of the present invention, the insulating layer is further disposed between the continuous line segment and the second touch electrode.

In one embodiment of the present invention, the touch apparatus further includes a second conductive pattern and a third conductive pattern. The second conductive pattern has a main portion and a dummy portion. The main portion of the second conductive pattern is electrically connected to the second touch electrode. The dummy portion of the second conductive pattern is electrically connected to the third touch electrode, and the main portion of the second conductive pattern is structurally separated from the dummy portion of the second conductive pattern. The first conductive pattern, the second conductive pattern and the third conductive pattern are arranged in a second direction. The first direction is interlaced with the second direction. The third conductive pattern crosses the first touch electrode, the second touch electrode and the line region and then is electrically connected to the third touch electrode, and the third conductive pattern has a nonlinear portion disposed on the line region.

In one embodiment of the present invention, the touch apparatus further includes an insulating layer disposed between the first conductive pattern and the third touch electrode, between the second conductive pattern and the third touch electrode and between the third conductive pattern and the third touch electrode. The insulating layer has a plurality of first contact windows. The third touch electrode is electrically connected to the dummy portion of the first conductive pattern, the dummy portion of the second conductive pattern and the third conductive pattern through the plurality of first contact windows. The plurality of pixel structures include a plurality of first pixel structures overlapping with the third touch electrode, and the plurality of first contact windows are respectively disposed beside the plurality of first pixel structures.

In one embodiment of the present invention, the plurality of first contact windows are arrayed.

In one embodiment of the present invention, the plurality of first contact windows are randomly arranged.

In one embodiment of the present invention, the plurality of first contact windows are disposed between the plurality of first pixel structures overlapping with the third touch electrode and the nonlinear portion of the third conductive pattern.

In one embodiment of the present invention, the substrate has an edge. The third touch electrode is disposed between the edge of the substrate and the transparent window, and the plurality of first contact windows are disposed between the plurality of first pixel structures overlapping with the third touch electrode and the edge of the substrate.

In one embodiment of the present invention, the touch apparatus further includes a light shielding pattern that shields the plurality of first contact windows.

In one embodiment of the present invention, the insulating layer further has a second contact window disposed on the active region. The first touch electrode is electrically connected to the main portion of the first conductive pattern through the second contact window of the insulating layer. A vertical projection area of one of the plurality of first contact windows on the substrate is larger than a vertical projection area of the second contact window on the substrate.

In order to make the aforementioned and other objectives and advantages of the present invention comprehensible, embodiments accompanied with figures are described in detail below.

BRIEF DESCRIPTION OF THE DRAWINGS

FIG. 3 illustrates a pixel structure PX, a portion of a touch electrode 120 and a portion of a conductive pattern 130.

DESCRIPTION OF THE EMBODIMENTS

Figure 1:
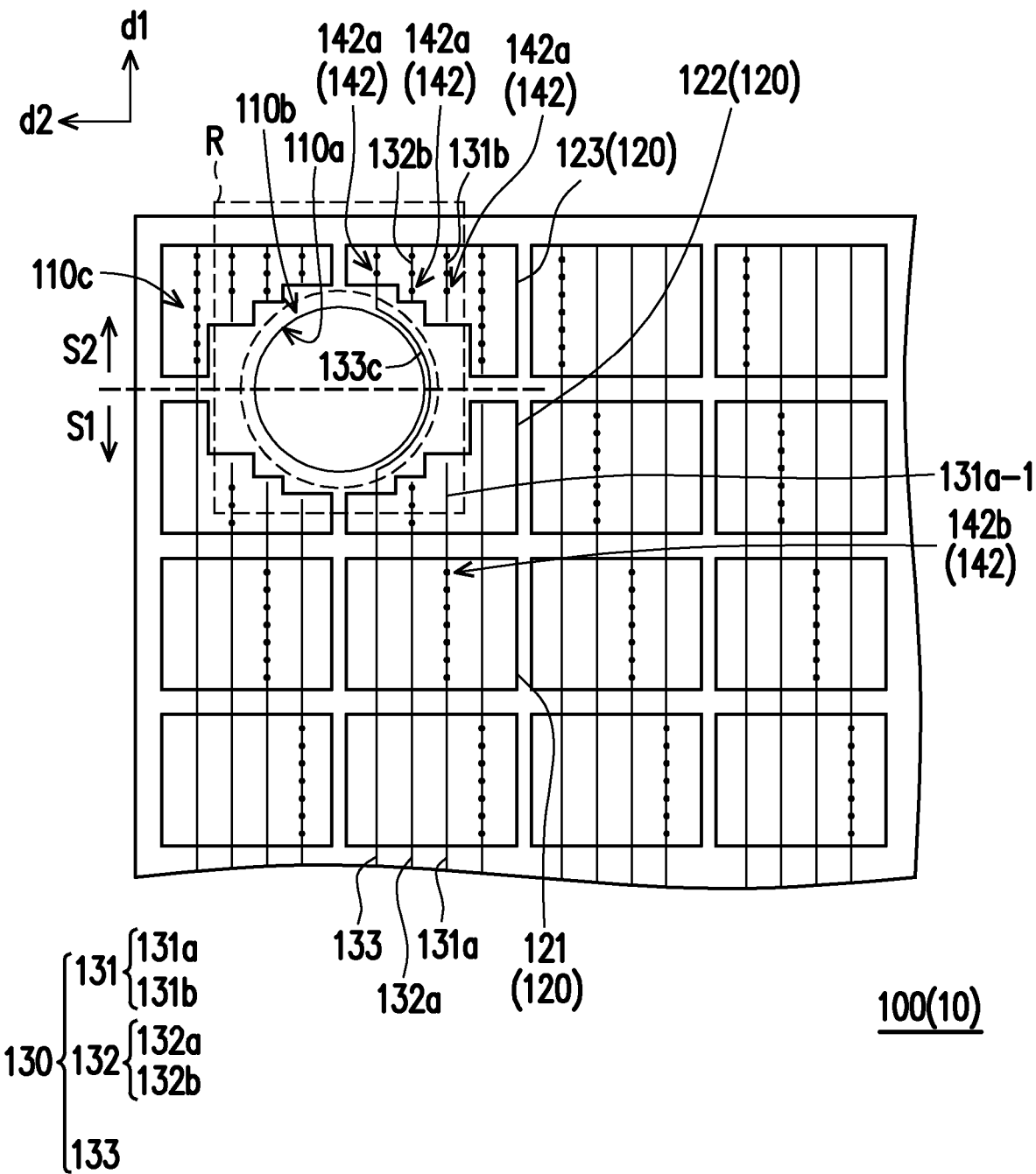
FIG. 1 is a schematic top view of a touch apparatus 10 of an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

It should be understood that when a component such as a layer, film, region or substrate is referred to as being "on" or "connected" to another component, it may be directly on or connected to the another component, or intervening components may also be present. In contrast, when a component is referred to as being "directly on" or "directly connected to" another component, there are no intervening assemblies present. As used herein, "connection" may refer to a physical and/or electrical connection. Besides, when the term "electrically connected to" or "coupled" is used, there may exist other intervening elements between two elements.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Unless otherwise defined, all terms (including technical and scientific terms) used herein have the same meaning as commonly understood by one of ordinary skill in the art to which the present invention belongs. It will be further understood that terms such as those defined in commonly used dictionaries should be interpreted as having a meaning that is consistent with their meaning in the context of the relevant art and the present invention and will not be interpreted in an idealized or overly formal sense unless expressly so defined herein.

FIG. 1 is a schematic top view of a touch apparatus 10 of an embodiment of the present invention.

Figure 2:
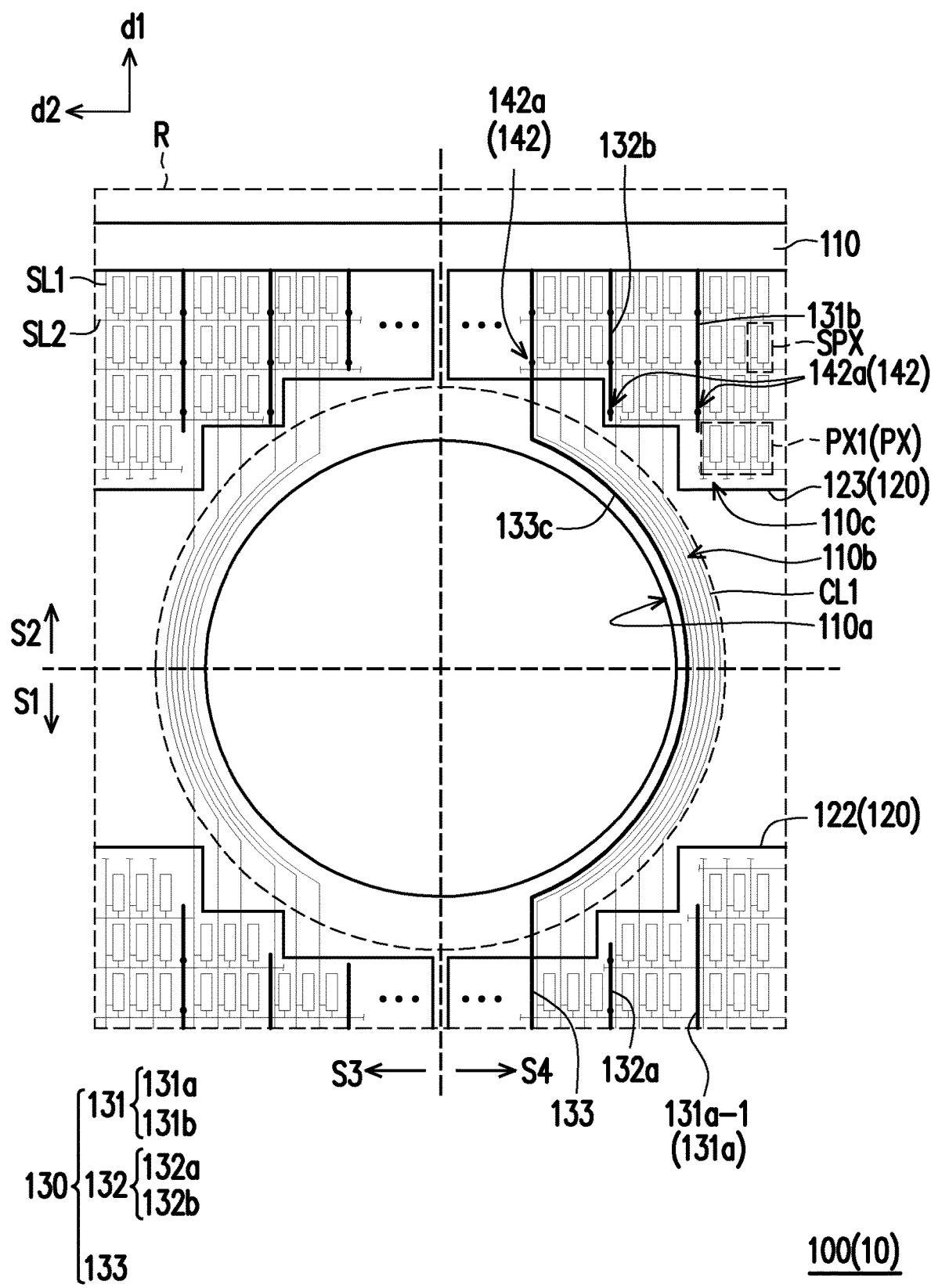
FIG. 2 is an enlarged schematic diagram of a portion R of a touch apparatus 10 of an embodiment of the present invention.

FIG. 2 is an enlarged schematic diagram of a portion R of a touch apparatus 10 of an embodiment of the present invention.

FIG. 2 corresponds to the portion R of FIG. 1. Pixel structures PX and first connection lines CL1 of FIG. 2 are omitted in FIG. 1.

Figure 3:
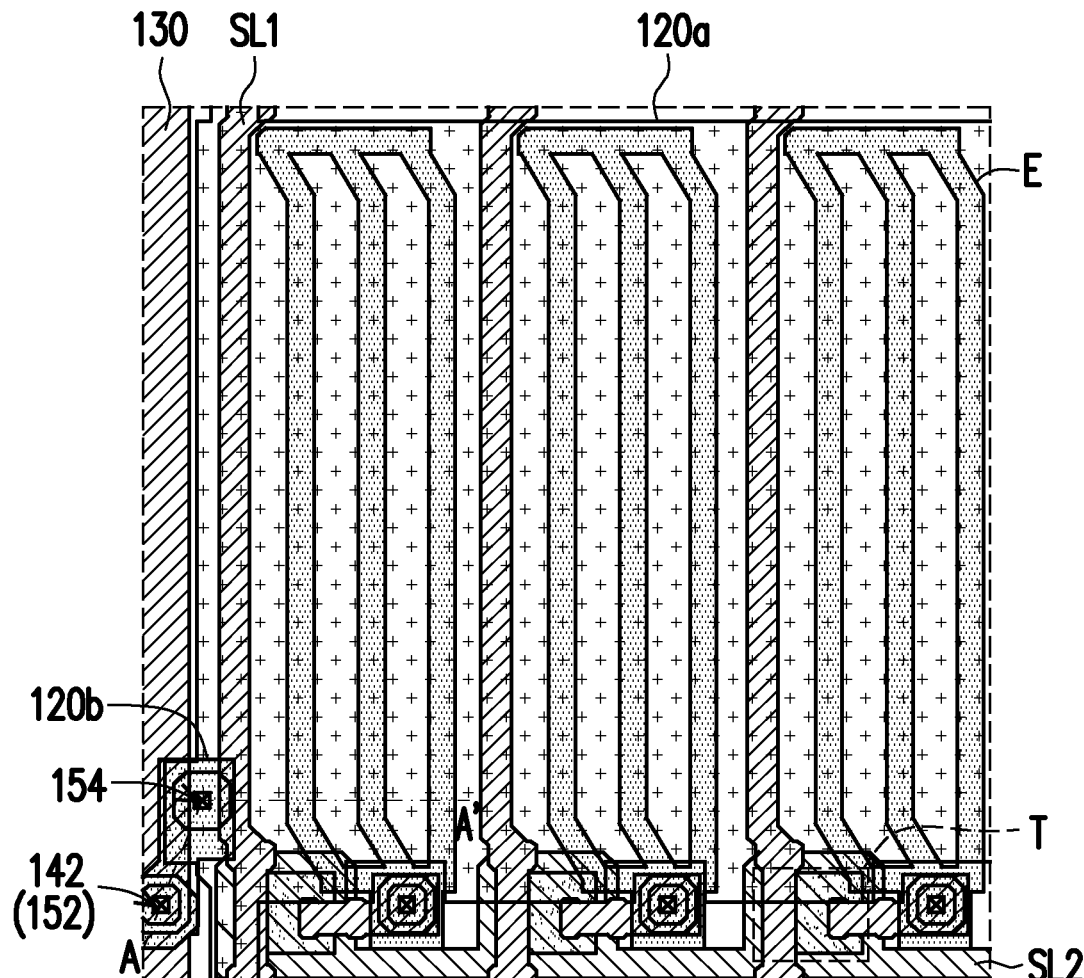
FIG. 3 is a layout schematic diagram of a touch apparatus 10 of an embodiment of the present invention.

FIG. 3 is a layout schematic diagram of a touch apparatus 10 of an embodiment of the present invention. FIG. 3 illustrates a pixel structure PX, a portion of a touch electrode 120 and a portion of a conductive pattern 130.

Figure 4:
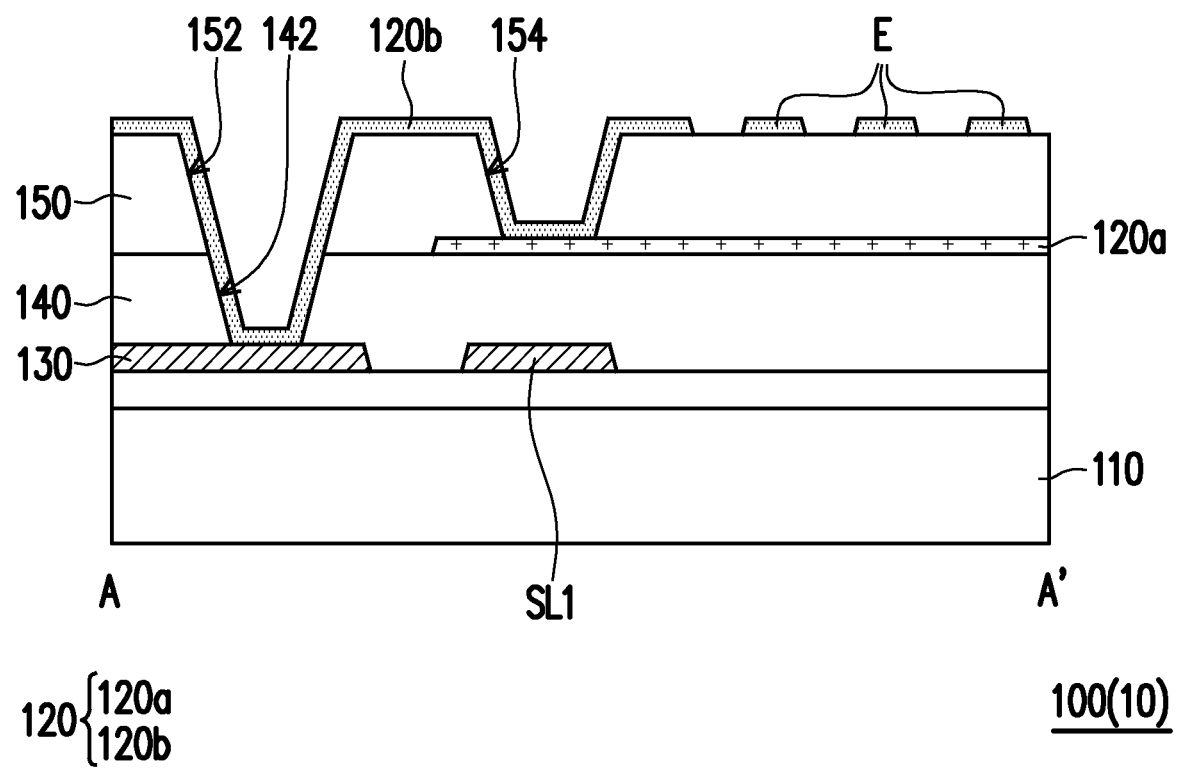
FIG. 4 is a cross-sectional schematic diagram of a touch apparatus 10 of an embodiment of the present invention.

FIG. 4 is a cross-sectional schematic diagram of a touch apparatus 10 of an embodiment of the present invention. FIG. 4 corresponds to the split line A-A' of FIG. 3.

Referring to FIGS. 1, 2, 3 and 4, the touch apparatus 10 includes a pixel array substrate 100. The pixel array substrate 100 includes a first substrate 110, a plurality of pixel structures PX, a plurality of touch electrodes 120 and a plurality of conductive patterns 130.

The first substrate 110 has a transparent window 110a, a line region 110b and an active region 110c. The line region 110b is located around the transparent window 110a, and the line region 110b is located between the active region 110c and the transparent window 110a.

For example, in the present embodiment, the transparent window 110a may be a through hole of the first substrate 110. At least one electronic element (for example, but not limited to: a camera, a loudspeaker, an ambient light sensor, other electronic elements or a combination thereof) is disposed inside or below the through hole. However, the present invention is not limited thereto. According to other embodiments, the transparent window 110a may also be a light transmissive material portion of the first substrate 110. No light blocking pattern is disposed on the light transmissive material portion.

Referring to FIGS. 2 and 3, the plurality of pixel structures PX are disposed on the active region 110c of the first substrate 110. Each pixel structure PX includes at least one sub-pixel structure SPX. For example, in the present embodiment, each pixel structure PX may include three sub-pixel structures SPX. The three sub-pixel structures SPX are respectively configured to display a first color, a second color and a third color. The first color, the second color and the third color may be red, green and blue, but the present invention is not limited thereto.

In the present embodiment, each sub-pixel structure SPX includes a first signal line SL1, a second signal line SL2, an active element T and a pixel electrode E. The first signal line SL1 and the second signal line SL2 are alternately disposed. The active element T is electrically connected to the first signal line SL1 and the second signal line SL2, and the pixel electrode E is electrically connected to the active element T.

The pixel array substrate 100 further includes a plurality of first connection lines CL1 disposed on the line region 110b of the first substrate 110. Each of the first connection lines CL1 is electrically connected with the plurality of first signal lines SL1 of the plurality of pixel structures PX respectively located at a first side S1 (such as the lower side) of the transparent window 110a and a second side S2 (such as the upper side) of the transparent window 110a.

The pixel array substrate 100 further includes a plurality of second connection lines (not shown), disposed on the line region 110b of the first substrate 110. Each of the second connection lines is electrically connected with the plurality of second signal lines SL2 of the plurality of pixel structures PX respectively located at a third side S3 (such as the left side) of the transparent window 110a and a fourth side S4 (such as the right side) of the transparent window 110a. For clarity of the drawings, illustration of the second connection lines is omitted.

Referring to FIGS. 2, 3 and 4, the plurality of touch electrodes 120 are disposed on the active region 110c of the first substrate 110 and overlap with the plurality of pixel structures PX. For example, in the present embodiment, the pixel electrode E of each pixel structure PX overlaps with one portion of one touch electrode 120, and a potential difference between the pixel electrode E and the touch electrode 120 is used to drive display mediums (for example, but not limited to, liquid crystals). That is, in the present embodiment, the touch electrode 120 may be a common electrode, and the touch apparatus 10 is an in-cell touch and display panel.

At least one portion of each conductive pattern 130 is configured to electrically connect a corresponding one touch electrode 120 to a touch driving circuit (for example, but not limited to, a wafer; not shown). Each touch electrode 120 is electrically connected with at least one corresponding conductive pattern 130. Specifically, in the present embodiment, a first insulating layer 140 is disposed between the touch electrodes 120 and the conductive patterns 130, and the touch electrodes 120 are electrically connected to the conductive patterns 130 through a contact window 142 of the first insulating layer 140.

For example, in the present embodiment, the first insulating layer 140 is disposed on the conductive patterns 130, and the touch electrodes 120 include main portions 120a overlapping with the pixel electrodes E and bridging portions 120b extending to the outside of the main portions 120a. The main portions 120a of the touch electrodes 120 are disposed on the first insulating layer 140. A second insulating layer 150 is disposed on the main portions 120a of the touch electrodes 120, and the bridging portions 120b of the touch electrodes 120 and the pixel electrodes E are disposed on the second insulating layer 150. The bridging portions 120b of the touch electrodes 120 and the pixel electrodes E are formed on the same film layer and are structurally separated. One end of the bridging portion 120b of each touch electrode 120 is electrically connected to the main portion 120a of the touch electrode 120 through a contact window 154 of the second insulating layer 150, and the other end of the bridging portion 120b of the touch electrode 120 is electrically connected to each conductive pattern 130 through a contact window 152 of the second insulating layer 150 and the contact window 142 of the first insulating layer 140, so as to allow the main portion 120a of the touch electrode 120 to be electrically connected to the at least one corresponding conductive pattern 130. However, the present invention is not limited thereto. According to other embodiments, the touch electrode 120 may also be electrically connected to at least one corresponding conductive pattern 130 in other ways.

Referring to FIGS. 1, 2 and 3, the plurality of touch electrodes 120 include a first touch electrode 121, a second touch electrode 122 and a third touch electrode 123. The first touch electrode 121 and the second touch electrode 122 are located at the first side S1 of the transparent window 110a, and the third touch electrode 123 is located at the second side S2 of the transparent window 110a. The first touch electrode 121, the second touch electrode 122 and the third touch electrode 123 are sequentially arranged in a first direction d1. The plurality of conductive patterns 130 include a first conductive pattern 131, a second conductive pattern 132 and a third conductive pattern 133. The first conductive pattern 131, the second conductive pattern 132 and the third conductive pattern 133 are arranged in a second direction d2. The first direction d1 is interlaced with the second direction d2.

The first conductive pattern 131 has a main portion 131a and a dummy portion 131b. The main portion 131a of the first conductive pattern 131 is electrically connected to the first touch electrode 121. The first touch electrode 121 is electrically connected to the touch driving circuit (not shown) through the main portion 131a of the first conductive pattern 131. The main portion 131a of the first conductive pattern 131 overlaps with the second touch electrode 122, and the first conductive pattern 131 is electrically isolated from the second touch electrode 122. The dummy portion 131b of the first conductive pattern 131 is electrically connected to the third touch electrode 123 and structurally separated from the main portion 131a of the first conductive pattern 131. In the present embodiment, the main portion 131a of the first conductive pattern 131 and the dummy portion 131b of the first conductive pattern 131 are substantially aligned in the first direction d1, but the present invention is not limited thereto.

In the present embodiment, the contact window 142 of the first insulating layer 140 includes a first contact window 142a and a second contact window 142b. The third touch electrode 123 is electrically connected to the dummy portion 131b of the first conductive pattern 131 through the first contact window 142a of the first insulating layer 140. The first touch electrode 121 is electrically connected to the main portion 131a of the first conductive pattern 131 through the second contact window 142b of the first insulating layer 140. The main portion 131a of the first conductive pattern 131 includes a continuous line segment 131a-1, a vertical projection of the continuous line segment 131a-1 on the first substrate 110 is located between a vertical projection of the first contact window 142a on the first substrate 110 and a vertical projection of the second contact window 142b on the first substrate 110, and the continuous line segment 131a-1 overlaps with the second touch electrode 122. The first insulating layer 140 is sandwiched between the continuous line segment 131a-1 of the main portion 131a of the first conductive pattern 131 and the second touch electrode 122, so as to electrically isolate the first conductive pattern 131 from the second touch electrode 122.

The second conductive pattern 132 has a main portion 132a and a dummy portion 132b. The main portion 132a of the second conductive pattern 132 is electrically connected to the second touch electrode 122. The second touch electrode 122 is electrically connected to the touch driving circuit (not shown) through the main portion 132a of the second conductive pattern 132. The dummy portion 132b of the second conductive pattern 132 is electrically connected to the third touch electrode 123, and the main portion 132a of the second conductive pattern 132 is structurally separated from the dummy portion 132b of the second conductive pattern 132. In the present embodiment, the main portion 132a of the second conductive pattern 132 and the dummy portion 132b of the second conductive pattern 132 are substantially aligned in the first direction d1, but the present invention is not limited thereto.

The third conductive pattern 133 crosses the first touch electrode 121, the second touch electrode 122 and the line region 110b of the first substrate 110, and then is electrically connected to the third touch electrode 123. The third touch electrode 123 is electrically connected to the touch driving circuit (not shown) through the third conductive pattern 133. The third conductive pattern 133 has a nonlinear portion 133c disposed on the line region 110b. For example, in the present embodiment, the nonlinear portion 133c of the third conductive pattern 133 may be an arc segment. However, the present invention is not limited thereto. According to other embodiments, the nonlinear portion 133c of the third conductive pattern 133 may also include line segments of other shapes, for example, but not limited to: a steplike line segment.

A plurality of contact windows 142 of the first insulating layer 140 include a plurality of first contact windows 142a. The third touch electrode 123 is electrically connected to the dummy portion 131b of the first conductive pattern 131, the dummy portion 132b of the second conductive pattern 132 and the third conductive pattern 133 through the plurality of first contact windows 142a. The plurality of pixel structures PX include a plurality of first pixel structures PX1 overlapping with the third touch electrode 123. In the present embodiment, the plurality of first contact windows 142a may be respectively disposed beside the plurality of first pixel structures PX1. That is, one first contact window 142a may be disposed beside each first pixel structure PX1, and the plurality of first contact windows 142a are arrayed. However, the present invention is not limited thereto. According to other embodiments, the plurality of first contact windows 142a may also be disposed at other positions and/or arranged in other ways, which will be illustrated in the subsequent paragraphs with reference to other drawings.

It must be noted that the following embodiment uses the element reference numerals and partial contents of the aforementioned embodiments. The same reference numerals refer to the same or similar elements, and the description of the same technical content is omitted. The description of the omitted part may refer to the aforementioned embodiment, and thus is no longer repeated in the following embodiment.

Figure 5:
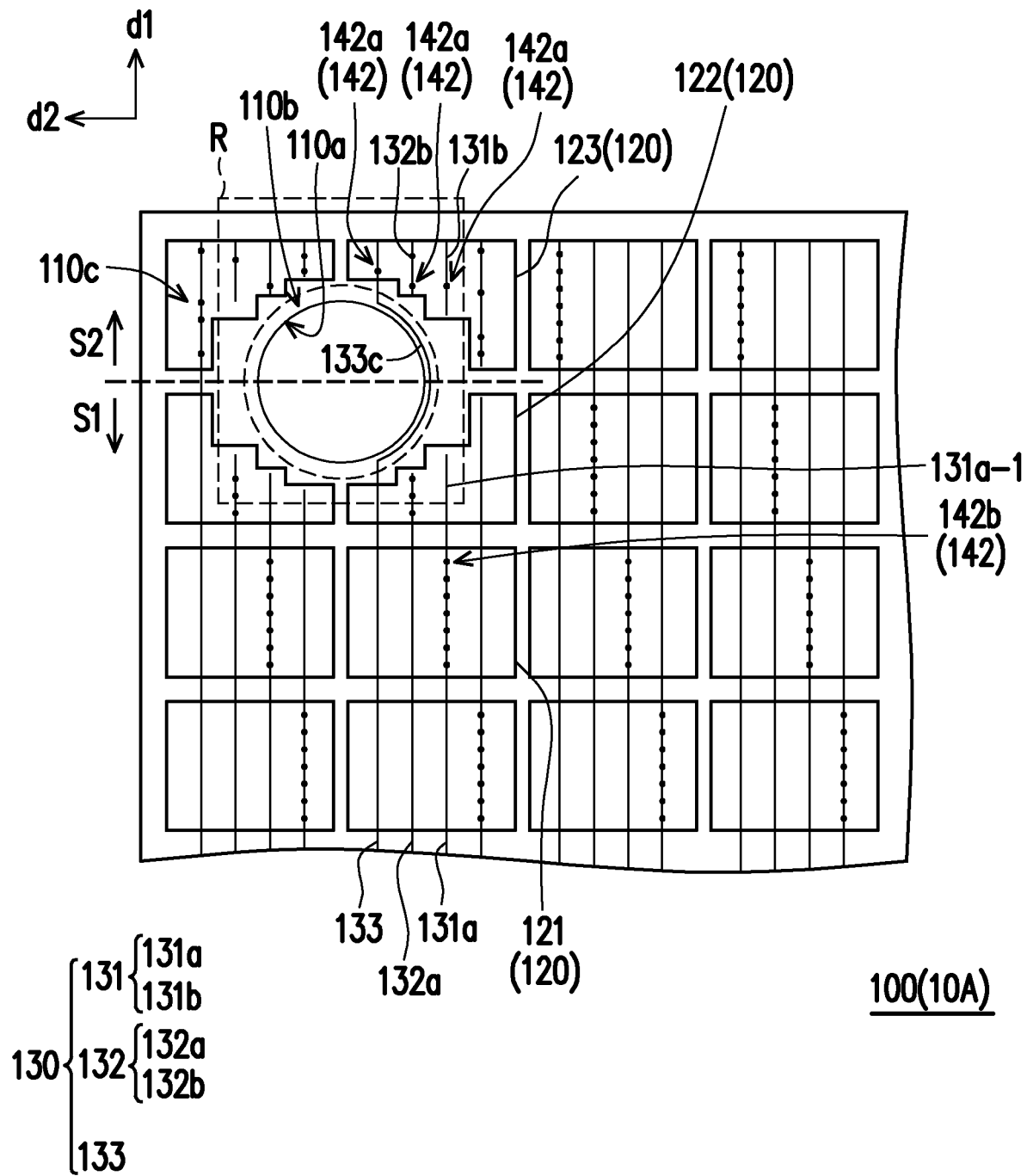
FIG. 5 is a schematic top view of a touch apparatus 10A of another embodiment of the present invention.

FIG. 5 is a schematic top view of a touch apparatus 10A of another embodiment of the present invention.

Figure 6:
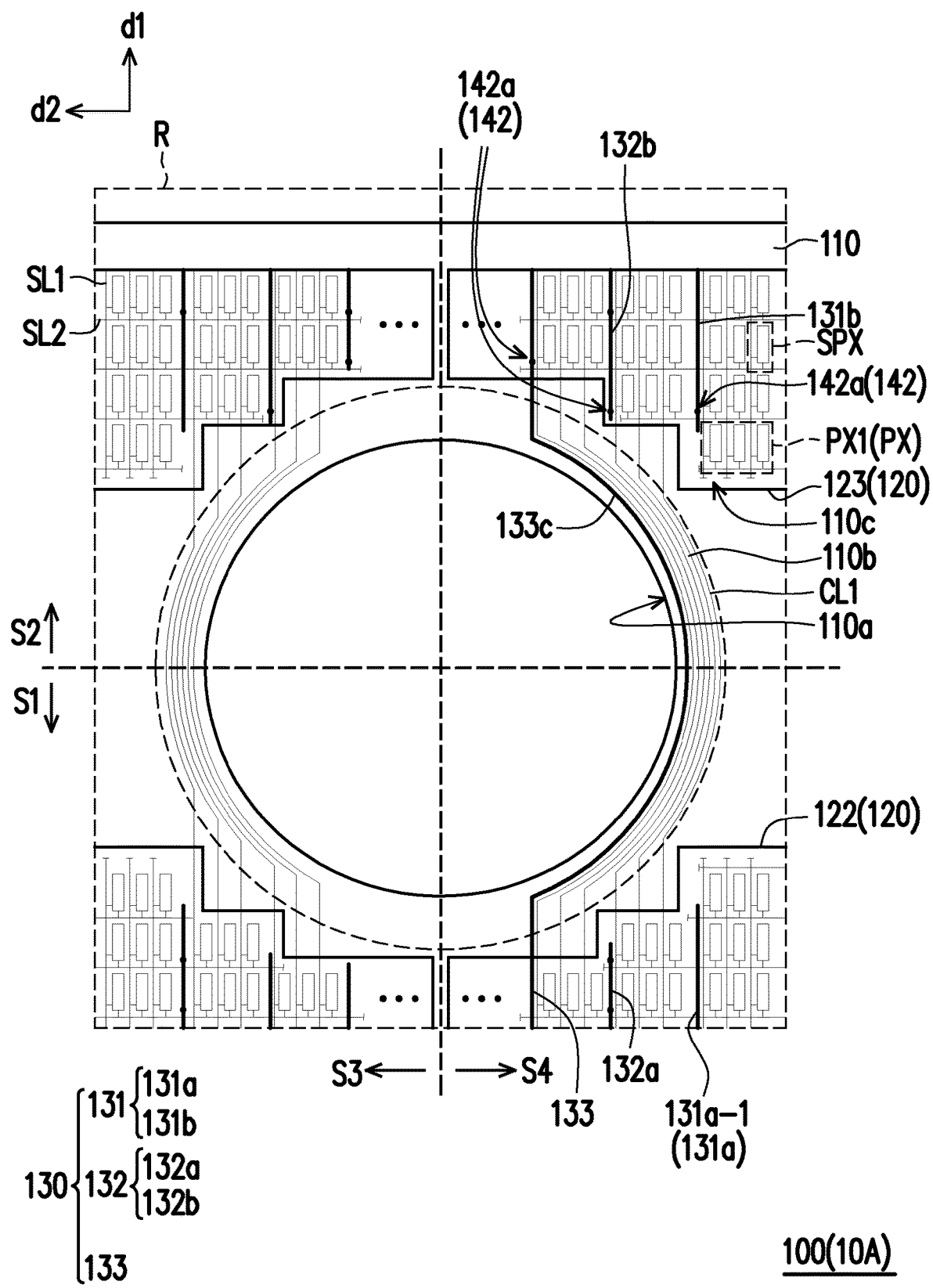
FIG. 6 is an enlarged schematic diagram of a portion R of a touch apparatus 10A of another embodiment of the present invention.

FIG. 6 is an enlarged schematic diagram of a portion R of a touch apparatus 10A of another embodiment of the present invention. FIG. 6 corresponds to the portion R of FIG. 5. A pixel structure PX and a first connection line CL1 of FIG. 6 are omitted in FIG. 5.

The touch apparatus 10A of the present embodiment is similar to the aforementioned touch apparatus 10. A difference therebetween is that: the arrangement mode of the plurality of first contact windows 142a of the touch apparatus 10A is different from that of the plurality of first contact windows 142a of the touch apparatus 10. Referring to FIGS. 5 and 6, specifically, in the present embodiment, the plurality of first contact windows 142a of the touch apparatus 10A are randomly arranged.

Figure 7:
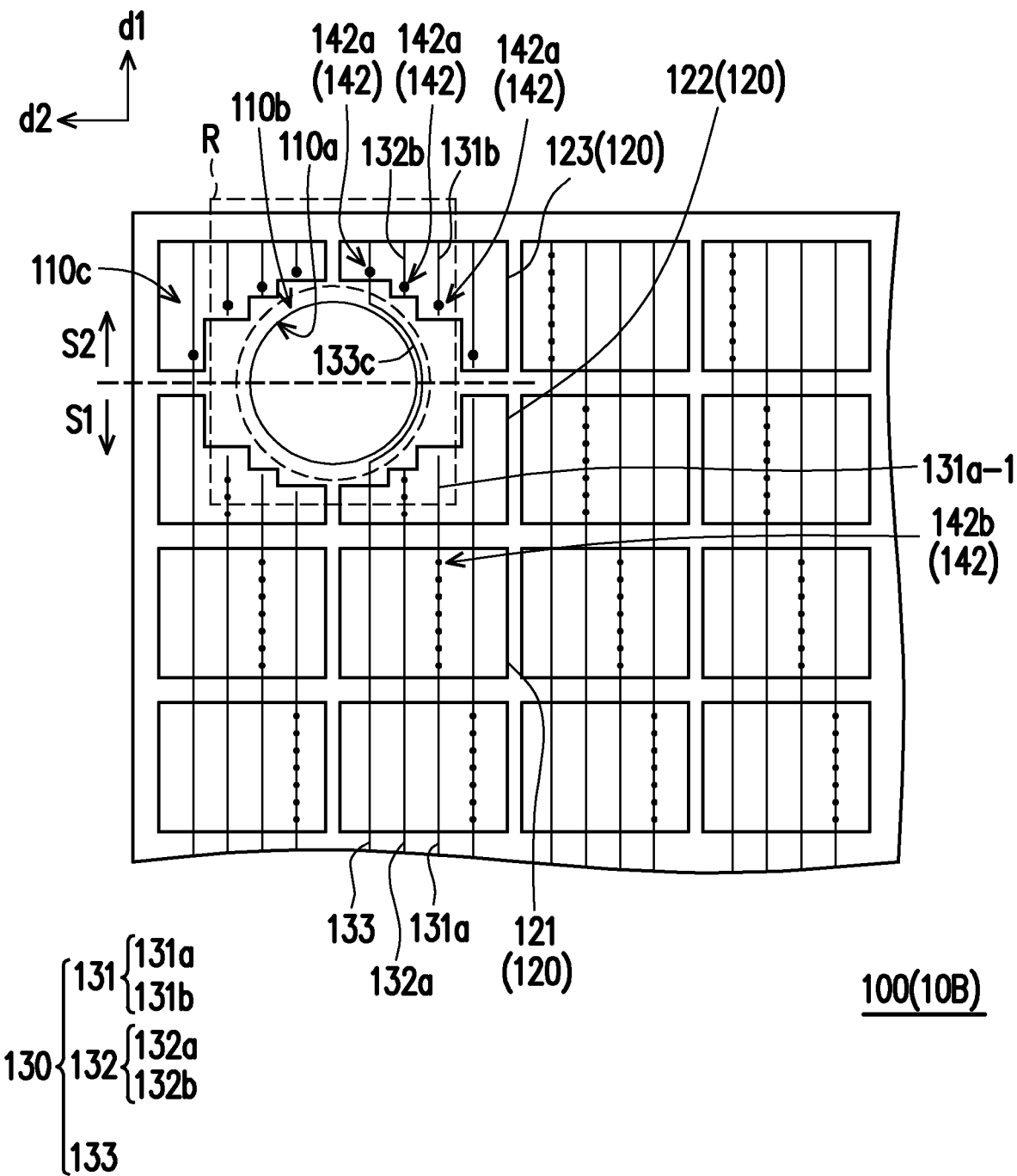
FIG. 7 is a schematic top view of a touch apparatus 10B of a further embodiment of the present invention.

FIG. 7 is a schematic top view of a touch apparatus 10B of a further embodiment of the present invention.

Figure 8:
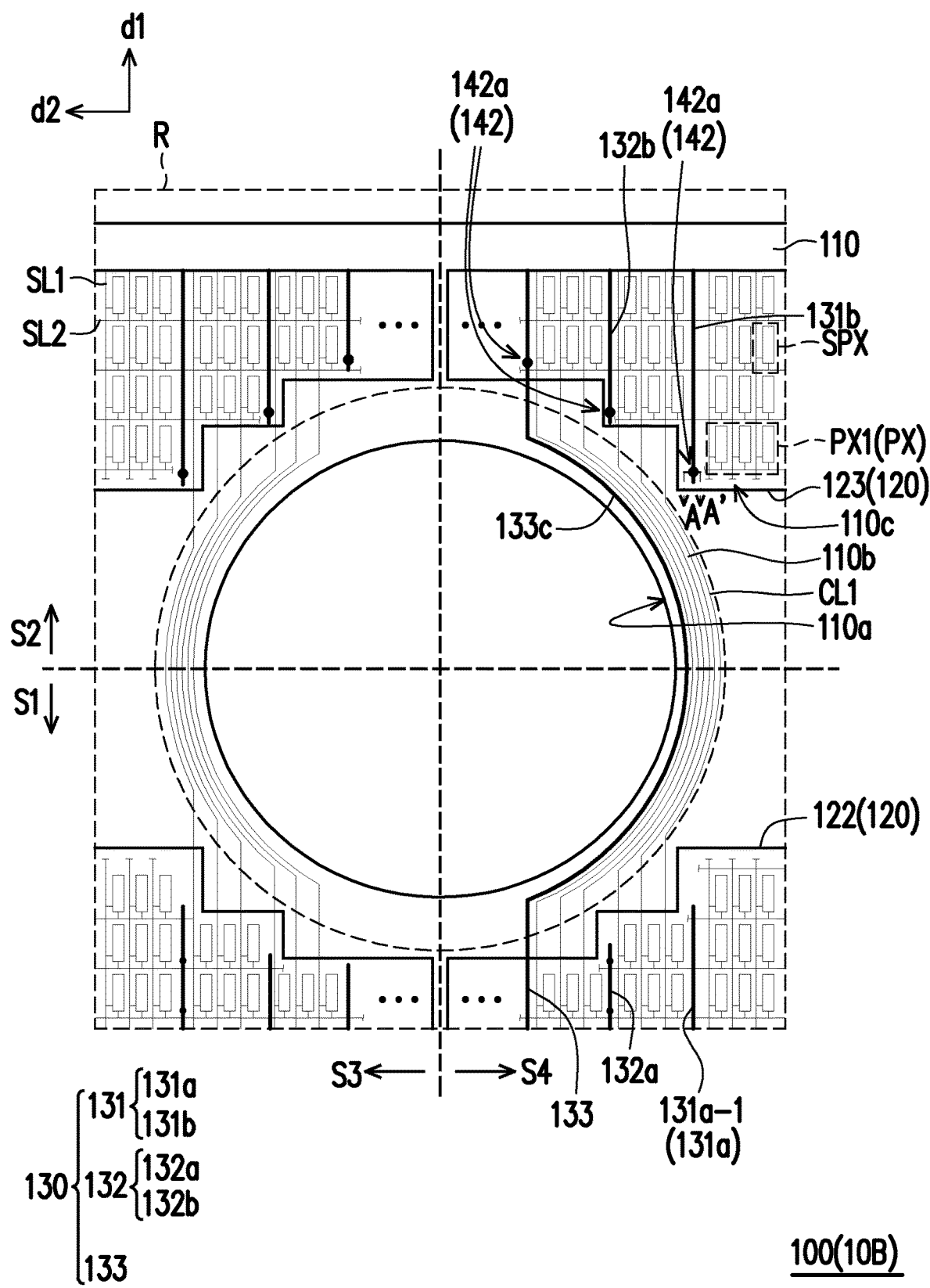
FIG. 8 is an enlarged schematic diagram of a portion R of a touch apparatus 10B of a further embodiment of the present invention.

FIG. 8 is an enlarged schematic diagram of a portion R of a touch apparatus 10B of a further embodiment of the present invention. FIG. 8 corresponds to the portion R of FIG. 7. Pixel structures PX and first connection lines CL1 of FIG. 8 are omitted in FIG. 7.

Figure 9:
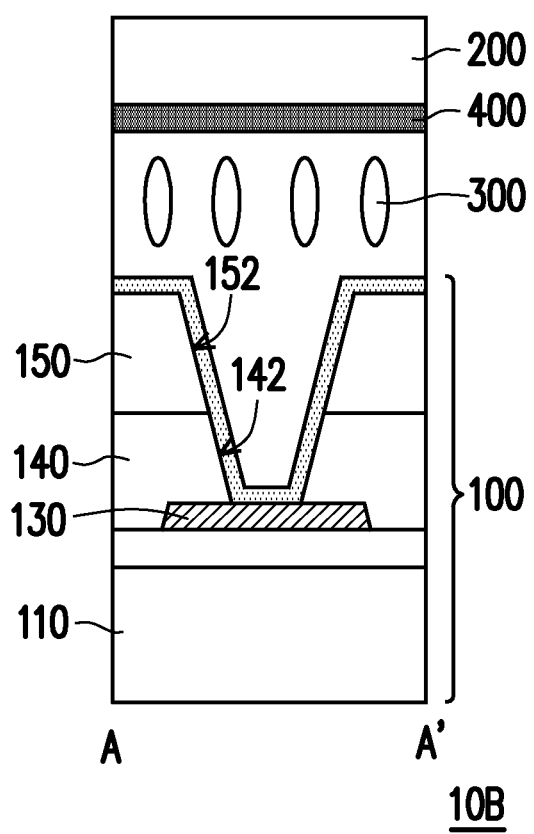
FIG. 9 is a cross-sectional schematic diagram of a touch apparatus 10B of a further embodiment of the present invention.

FIG. 9 is a cross-sectional schematic diagram of a touch apparatus 10B of a further embodiment of the present invention. FIG. 9 corresponds to the split line A-A' of FIG. 8. A second substrate 200, display mediums 300 and a light shielding pattern 400 of FIG. 9 are omitted in FIGS. 7 and 8.

The touch apparatus 10B of the present embodiment is similar to the aforementioned touch apparatus 10. A difference therebetween is that: the setting positions of the plurality of first contact windows 142a of the touch apparatus 10B are different from those of the plurality of first contact windows 142a of the touch apparatus 10.

Referring to FIGS. 7 and 8, specifically, in the present embodiment, the plurality of first contact windows 142a of the touch apparatus 10B are disposed between the plurality of first pixel structures PX1 overlapping with the third touch electrode 123 and the nonlinear portion 133c of the third conductive pattern 133. That is, the plurality of first contact windows 142a are disposed in an idle region between the active region 110c and the line region 110b.

The plurality of first contact windows 142a are disposed in the idle region between the active region 110c and the line region 110b to effectively use a layout space of the first substrate 110. In addition, since the first contact windows 142a are disposed in the idle region between the active region 110c and the line region 110b instead of being disposed on the active region 110c, poor displaying caused by a position change of the pixel array substrate 100 due to the arrangement of the first contact windows 142a is not easily caused.

Referring to FIGS. 8 and 9, in addition to the pixel array substrate 100, the touch apparatus 10B further includes a second substrate 200, display mediums 300 disposed between the first substrate 110 and the second substrate 200, and a light shielding pattern 400. In the present embodiment, the light shielding pattern 400 is selectively disposed on the second substrate 200. However, the present invention is not limited thereto. According to other embodiments, the light shielding pattern 400 may also be disposed on the first substrate 110 to form a black matrix on an array (BOA) structure.

In the present embodiment, the plurality of first contact windows 142a disposed on the idle region between the active region 110c and the line region 110b may be shielded by the light shielding pattern 400. A vertical projection area of one first contact window 142a shielded by the light shielding pattern 400 on the first substrate 110 may be larger than a vertical projection area of one second contact window 142b disposed on the active region 110c on the first substrate 110.

That is, the size of the first contact window 142a configured to electrically connect the third touch electrode 123 to the dummy portion 131b of the first conductive pattern 131, the dummy portion 132b of the second conductive pattern 132 and the third conductive pattern 133 is large enough to ensure that the third touch electrode 123 is electrically connected to the dummy portion 131b of the first conductive pattern 131, the dummy portion 132b of the second conductive pattern 132 and the third conductive pattern 133. In this way, it is not necessary to set other first contact windows of the first insulating layer 140 on the portion of active region 110c where the third touch electrode 123 is located. Therefore, the display quality of the region with the touch electrodes 120 located at the second side S2 of the transparent window 110a may be improved.

Figure 10:
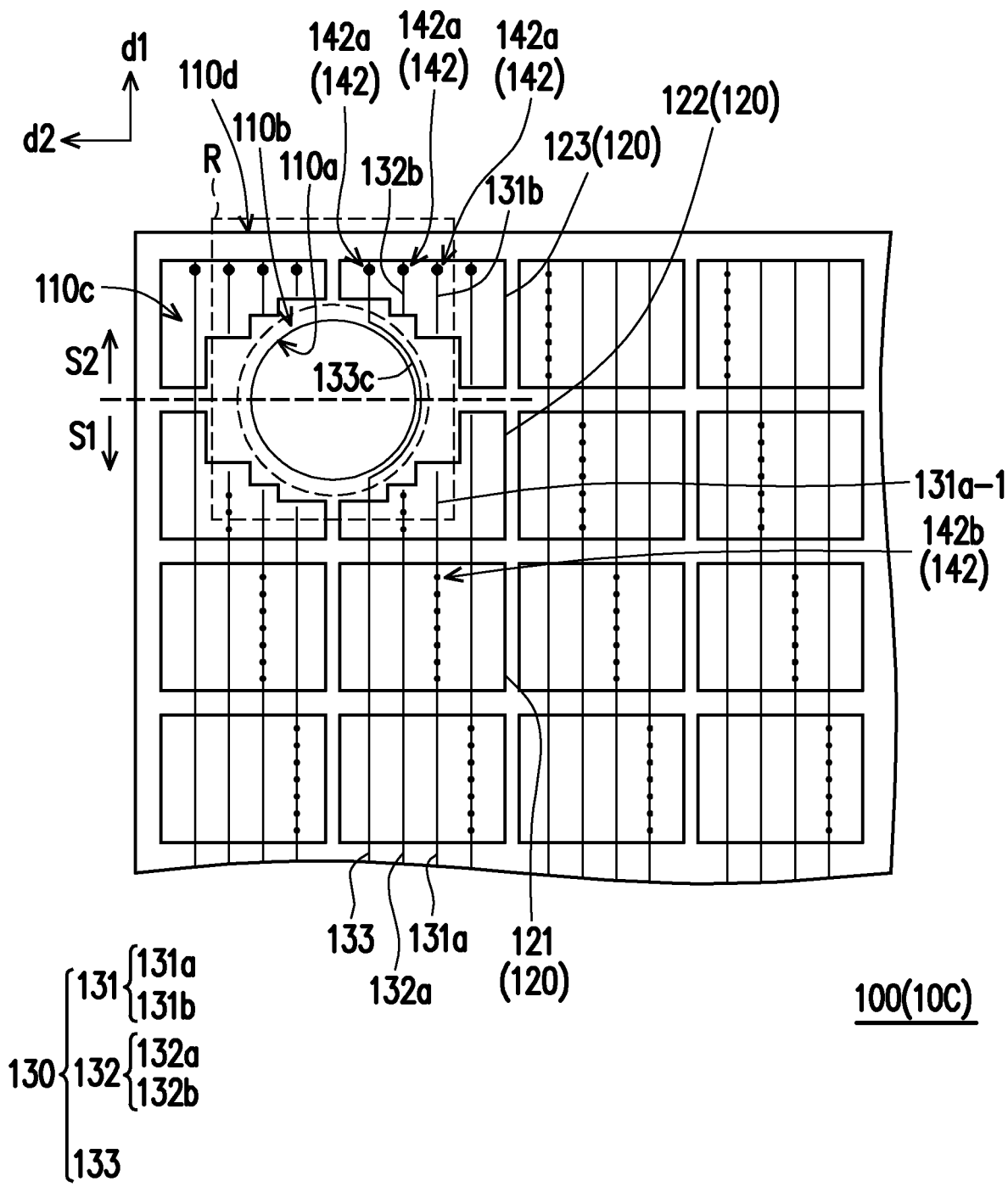
FIG. 10 is a schematic top view of a touch apparatus 10C of a further more embodiment of the present invention.

FIG. 10 is a schematic top view of a touch apparatus 10C of a further more embodiment of the present invention.

Figure 11:
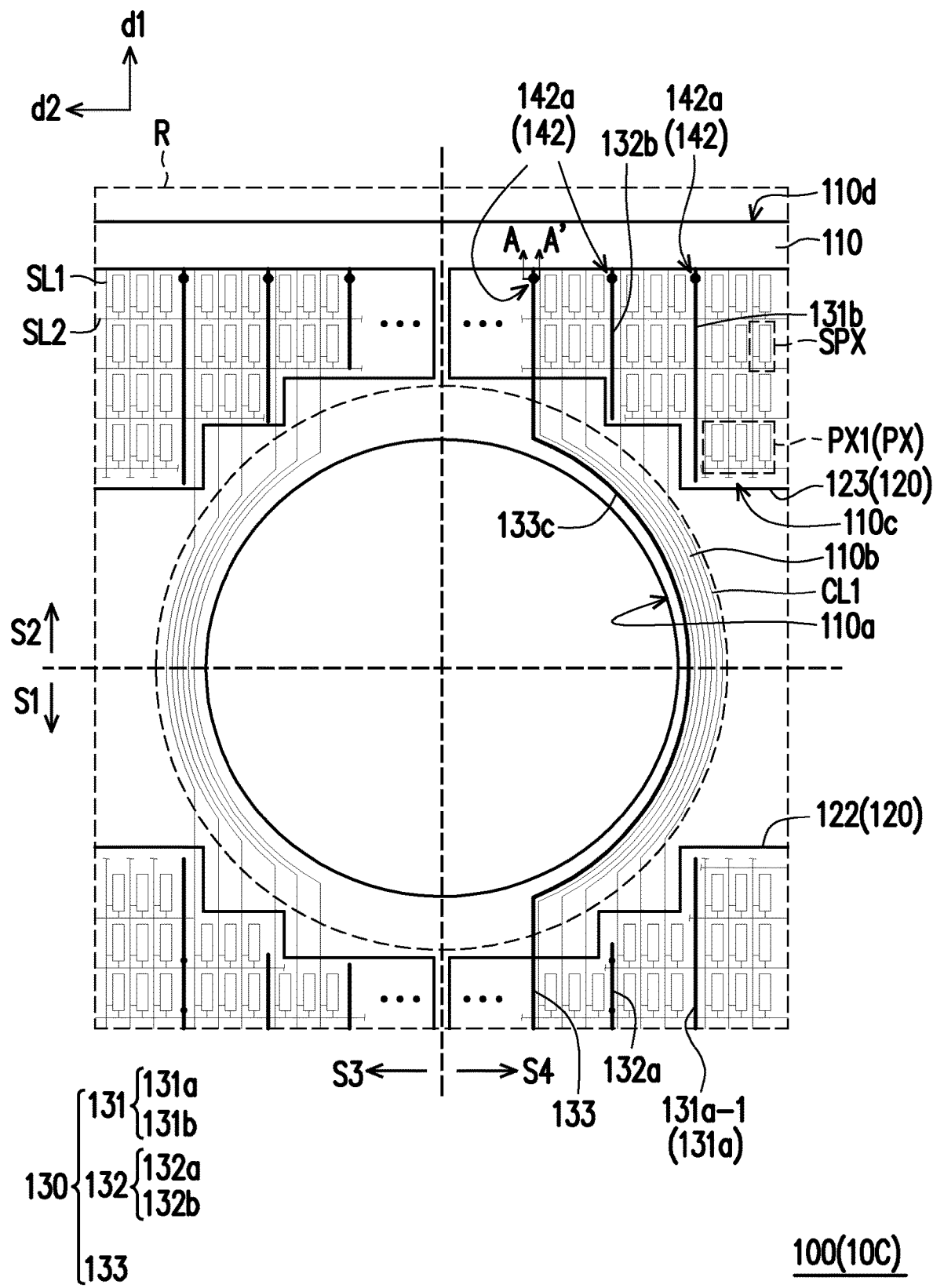
FIG. 11 is an enlarged schematic diagram of a portion R of a touch apparatus 10C of a further embodiment of the present invention.

FIG. 11 is an enlarged schematic diagram of a portion R of a touch apparatus 10C of a further embodiment of the present invention. FIG. 11 corresponds to the portion R of FIG. 10. Pixel structures PX and first connection lines CL1 of FIG. 11 are omitted in FIG. 10.

Figure 12:
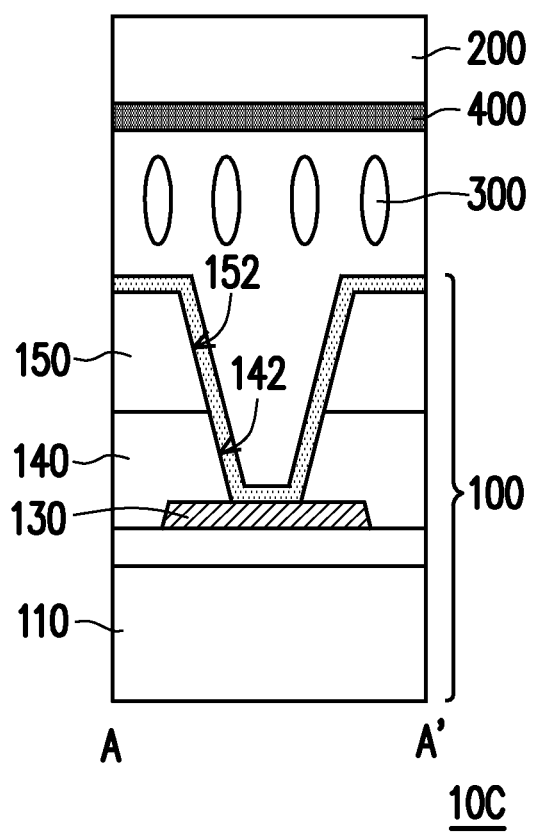
FIG. 12 is a cross-sectional schematic diagram of a touch apparatus 10C of a further embodiment of the present invention.

FIG. 12 is a cross-sectional schematic diagram of a touch apparatus 10C of a further embodiment of the present invention. FIG. 12 corresponds to the split line A-A' of FIG. 11.

The touch apparatus 10C of the present embodiment is similar to the aforementioned touch apparatus 10. A difference therebetween is that: the setting positions of the plurality of first contact windows 142a of the touch apparatus 10C are different from those of the plurality of first contact windows 142a of the touch apparatus 10.

Referring to FIGS. 10, 11 and 12, specifically, in the present embodiment, the third touch electrode 123 is disposed between an edge 110d of the first substrate 110 and the transparent window 110a, and the plurality of first contact windows 142a are disposed between the plurality of first pixel structures PX1 overlapping with the third touch electrode 123 and the edge 110d of the first substrate 110. That is, in the present embodiment, the plurality of first contact windows 142a overlapping with the third touch electrode 123 may be disposed in a border region of the touch apparatus 10C. In this way, the layout space of the first substrate 110 may be effectively used. In addition, since the first contact windows 142a are disposed in the border region of the touch apparatus 10C instead of being disposed on the active region 110c for displaying, poor displaying caused by a position change of the pixel array substrate 100 due to the arrangement of the first contact windows 142a is not easily caused.

In the present embodiment, the plurality of first contact windows 142a disposed on the border region of the touch apparatus 10C may be shielded by the light shielding pattern 400. A vertical projection area of one first contact window 142a shielded by the light shielding pattern 400 on the first substrate 110 may be larger than a vertical projection area of one second contact window 142b disposed on the active region 110c on the first substrate 110.

That is, the size of the first contact window 142a configured to electrically connect the third touch electrode 123 to the dummy portion 131b of the first conductive pattern 131, the dummy portion 132b of the second conductive pattern 132 and the third conductive pattern 133 is large enough to ensure that the third touch electrode 123 is electrically connected to the dummy portion 131b of the first conductive pattern 131, the dummy portion 132b of the second conductive pattern 132 and the third conductive pattern 133. In this way, it is not necessary to set other first contact windows of the first insulating layer 140 on the portion of active region 110c where the third touch electrode 123 is located. Therefore, the display quality of the region with the touch electrodes 120 located at the second side S2 of the transparent window 110a may be improved.

Based on the above, the touch apparatus according to an embodiment of the present invention includes the substrate, the plurality of pixel structures, the first touch electrode, the second touch electrode, the third touch electrode and the first conductive pattern. The transparent window of the substrate has the first side and the second side which are opposite. The first touch electrode, the second touch electrode, and the third touch electrode are sequentially arranged in the first direction. The first touch electrode and the second touch electrode are located at the first side of the transparent window. The third touch electrode is located at the second side of the transparent window. The first conductive pattern has the main portion and the dummy portion. The main portion of the first conductive pattern is electrically connected to the first touch electrode, and the main portion of the first conductive pattern overlaps with the second touch electrode and is electrically isolated from the second touch electrode. Particularly, the dummy portion of the first conductive pattern is electrically connected to the third touch electrode and structurally separated from the main portion of the first conductive pattern.

Since the dummy portion of the first conductive pattern is electrically connected to the third touch electrode instead of floating, the dummy portion of the first conductive pattern is less likely to cause the poor displaying. In addition, the dummy portion of the first conductive pattern is structurally separated from the main portion of the first conductive pattern, and the first conductive pattern does not need to include the portion disposed on the line region, thereby realizing a narrow-width line region to contribute to improvement of the visual effect of the touch apparatus.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A touch apparatus, comprising: a substrate, comprising a transparent window, a line region and an active region, wherein the line region is located around the transparent window, and the line region is located between the active region and the transparent window; a plurality of pixel structures, disposed on the active region of the substrate; a first touch electrode, a second touch electrode and a third touch electrode, disposed on the active region of the substrate and overlapping with the plurality of pixel structures, wherein the transparent window comprises a first side and a second side which are opposite; the first touch electrode and the second touch electrode are boated at the first side of the transparent window; the third touch electrode is located at the second side of the transparent window; and the first touch electrode, the second touch electrode and the third touch electrode are sequentially arranged in a first direction; and a first conductive pattern, comprising a main portion and a dummy portion, wherein the main portion of the first conductive pattern is electrically connected to the first touch electrode; the main portion of the first conductive pattern overlaps with the second touch electrode, and the main portion of the first conductive pattern is electrically isolated from the second touch electrode; and the dummy portion of the first conductive pattern is electrically connected to the third touch electrode and structurally separated from the main portion of the first conductive pattern.

2. The touch apparatus according to claim 1, further comprising:
an insulating layer, disposed between the first conductive pattern and the first touch electrode and between the first conductive pattern and the third touch electrode, wherein the insulating layer comprises a first contact window and a second contact window; the third touch electrode is electrically connected to the dummy portion of the first conductive pattern through the first contact window of the insulating layer; the first touch electrode is electrically connected to the main portion of the first conductive pattern through the second contact window of the insulating layer; the main portion of the first conductive pattern comprises a continuous line segment, and a vertical projection of the continuous line segment on the substrate is located between a vertical projection of the first contact window and a vertical projection of the second contact window; and the continuous line segment overlaps with the second touch electrode.

3. The touch apparatus according to claim 2, wherein the insulating layer is further disposed between the continuous line segment and the second touch electrode.

4. The touch apparatus according to claim 1, further comprising:
a second conductive pattern, comprising a main portion and a dummy portion, wherein the main portion of the second conductive pattern is electrically connected to the second touch electrode, and the dummy portion of the second conductive pattern is electrically connected to the third touch electrode, and the main portion of the second conductive pattern is structurally separated from the dummy portion of the second conductive pattern; and
a third conductive pattern, wherein the first conductive pattern, the second conductive pattern and the third conductive pattern are arranged in a second direction; the first direction is interlaced with the second direction; the third conductive pattern crosses the first touch electrode, the second touch electrode and the line region and then is electrically connected to the third touch electrode; and the third conductive pattern comprises a nonlinear portion disposed on the line region.

5. The touch apparatus according to claim 4, further comprising:
an insulating layer, disposed between the first conductive pattern and the third touch electrode, between the second conductive pattern and the third touch electrode and between the third conductive pattern and the third touch electrode, wherein the insulating layer comprises a plurality of first contact windows; the third touch electrode is electrically connected to the dummy portion of the first conductive pattern, the dummy portion of the second conductive pattern and the third conductive pattern through the plurality of first contact windows; and the plurality of pixel structures comprise a plurality of first pixel structures overlapping with the third touch electrode, and the plurality of first contact windows are respectively disposed beside the plurality of first pixel structures.

6. The touch apparatus according to claim 5, wherein the plurality of first contact windows are arrayed.

7. The touch apparatus according to claim 5, wherein the plurality of first contact windows are randomly arranged.

8. The touch apparatus according to claim 5, wherein the plurality of first contact windows are disposed between the plurality of first pixel structures overlapping with the third touch electrode and the nonlinear portion of the third conductive pattern.

9. The touch apparatus according to claim 8, further comprising:
a light shielding pattern, shielding the plurality of first contact windows.

10. The touch apparatus according to claim 9, wherein the insulating layer further comprises a second contact window disposed on the active region; the first touch electrode is electrically connected to the main portion of the first conductive pattern through the second contact window of the insulating layer; and a vertical projection area of one of the plurality of first contact windows on the substrate is larger than a vertical projection area of the second contact window on the substrate.

11. The touch apparatus according to claim 5, wherein the substrate comprises an edge; the third touch electrode is disposed between the edge of the substrate and the transparent window; and the plurality of first contact windows are disposed between the plurality of first pixel structures overlapping with the third touch electrode and the edge of the substrate.

12. The touch apparatus according to claim 11, further comprising:
a light shielding pattern, shielding the plurality of first contact windows.

13. The touch apparatus according to claim 12, wherein the insulating layer further comprises a second contact window disposed on the active region; the first touch electrode is electrically connected to the main portion of the first conductive pattern through the second contact window of the insulating layer; and a vertical projection area of one of the plurality of first contact windows on the substrate is larger than a vertical projection area of the second contact window on the substrate.

* * * * *